(12) United States Patent
Chilcote

(10) Patent No.: US 8,712,722 B2
(45) Date of Patent: Apr. 29, 2014

(54) 360-DEGREE ANGLE DECODER

(75) Inventor: Jason Chilcote, Frisco, TX (US)

(73) Assignee: Honeywell International, Inc., Morristown, NJ (US)

( * ) Notice: Subject to any disclaimer, the term of this patent is extended or adjusted under 35 U.S.C. 154(b) by 520 days.

(21) Appl. No.: 13/038,052

(22) Filed: Mar. 1, 2011

(65) Prior Publication Data

US 2012/0223761 A1 Sep. 6, 2012

(51) Int. Cl.
*G01B 7/00* (2006.01)
*G01B 21/00* (2006.01)
*G06F 19/00* (2011.01)

(52) U.S. Cl.
USPC ............. 702/151; 73/865.8; 327/355; 702/1; 702/127; 708/200

(58) Field of Classification Search
USPC ................. 33/501, 534; 73/1.01, 1.75, 432.1, 73/865.8, 865.9; 327/100, 334, 356, 360, 327/361; 702/1, 127, 150, 151, 187, 189; 708/100, 105, 200, 446
IPC ................. G01B 7/20,21/00; G01D 1/00, 1/14, G01D 1/16, 7/00, 21/00; G06F 11/00, 11/30, G06F 11/32, 17/00, 17/40, 19/00
See application file for complete search history.

(56) References Cited

U.S. PATENT DOCUMENTS

| 4,109,189 | A | * | 8/1978 | Jacques et al. | 318/608 |
| 5,719,789 | A | * | 2/1998 | Kawamata | 702/189 |
| 6,490,807 | B1 | * | 12/2002 | Tanaka et al. | 33/708 |
| 6,707,293 | B2 | | 3/2004 | Wan et al. | |
| 6,757,635 | B2 | * | 6/2004 | Topmiller | 702/150 |
| 7,310,587 | B2 | * | 12/2007 | Topmiller | 702/150 |
| 2003/0110003 | A1 | * | 6/2003 | Topmiller | 702/150 |
| 2004/0208473 | A1 | * | 10/2004 | Topmiller | 385/147 |
| 2009/0102460 | A1 | * | 4/2009 | Schott et al. | 324/207.2 |
| 2012/0223699 | A1 | | 9/2012 | Holman, Jr. | |

FOREIGN PATENT DOCUMENTS

| DE | 3446049 A1 | 6/1986 |
| DE | 19928482 A1 | 12/2000 |
| EP | 1 870 677 A2 | 12/2007 |

OTHER PUBLICATIONS

Reply to communication from the Examining Division for EP Application No. 12157580.7, dated Oct. 30, 2012, 12 pages.

(Continued)

*Primary Examiner* — Edward Cosimano
(74) *Attorney, Agent, or Firm* — Craige Thompson; Thompson Patent Law Offices

(57) ABSTRACT

This disclosure is directed to techniques for decoding two or more signals that vary sinusoidally with respect to a parameter value to produce a decoded signal that varies linearly with respect to the parameter value. The techniques may include receiving a first signal and a second signal, the first signal varying with respect to a parameter value according to a first sinusoidal function having a period and a first phase, the second signal varying with respect to the parameter value according to a second sinusoidal function having the period and a second phase different from the first phase. The techniques may further include performing one or more arithmetic operations using the first signal, the second signal, and an offset value to generate a third signal that varies linearly with respect to the parameter value for at least one-half of the period of the first signal and the second signal.

26 Claims, 8 Drawing Sheets

(56) References Cited

OTHER PUBLICATIONS

"Applications of Magnetic Position Sensors," Solid State Electronics Center, downloaded from www51.honeywell.com/aero/common/documents/Applications-of-magnetic-position-sensors.pdf, 8 pages, downloaded on Feb. 28, 2011.

Application Sheet, "How to Apply Honeywell APS00B AMR Sensors," downloaded from sensing.honeywell.com/index.cfm/ci_id/158863/la_id/1/document/1/re_id/0, 7 pages, downloaded on Feb. 28, 2011.

Magnetoresistive Sensors, "Industry: Position and Solid State Sensing," downloaded from /sensing.honeywell.com/index.cfm/ci_id/140970/la_id/1/document/1/re_id/0, 3 pages, downloaded on Feb. 28, 2011.

European Search Report from counterpart EP Application No. 12157580.7, mailed Jun. 11, 2012, 3 pages.

Examination Report from counterpart EP Application No. 12157580.7, mailed Jun. 22, 2012, 5 pages.

* cited by examiner

360-DEGREE ANGLE DECODER

This disclosure relates to decoders, and more particularly, to decoders that are configured to decode two or more signals that vary sinusoidally with respect to a sensed parameter value.

BACKGROUND

Some types of sensors, such as angular position sensors for example, are configured to generate two or more sensing signals that vary sinusoidally with respect to a sensed parameter value. The two or more sensing signals may include a first sensing signal that varies with respect to the parameter value according to a sine function and a second sensing signal that varies with respect to the parameter value according to a cosine function. A decoder may be used to map the values of the two sensing signals to an output signal that corresponds to arctangent of the first sensing signal divided by the second sensing signal. Conventional decoders may perform the arctangent function digitally by using a look-up table.

SUMMARY

This disclosure is directed to analog techniques for decoding two or more signals that vary sinusoidally with respect to a parameter value to produce a decoded output signal indicative of the parameter value. In some examples, the techniques may use arithmetic operations to generate one or more signals that vary with respect to the parameter value in a substantially linear fashion over one or more intervals of the parameter value. The one or more linearly varying signals may be used to produce an output signal where each value of the output signals maps to a unique parameter value.

According to one example, a method includes receiving a first signal and a second signal, the first signal varying with respect to a parameter value according to a first sinusoidal function having a period and a first phase, the second signal varying with respect to the parameter value according to a second sinusoidal function having the period and a second phase different from the first phase. The method further includes performing, with a transfer function circuit, one or more arithmetic operations using the first signal, the second signal, and an offset value to generate a third signal that varies linearly with respect to the parameter value for at least one-half of the period of the first signal and the second signal.

According to another example, a device includes a transfer function circuit configured to receive a first signal and a second signal, the first signal varying with respect to a parameter value according to a first sinusoidal function having a period and a first phase, the second signal varying with respect to the parameter value according to a second sinusoidal function having the period and a second phase different from the first phase. The transfer function circuit is further configured to perform one or more arithmetic operations using the first signal, the second signal, and an offset value to generate a third signal that varies linearly with respect to the parameter value for at least one-half of the period of the first signal and the second signal.

The details of one or more examples are set forth in the accompanying drawings and the description below. Other features, objects, and advantages will be apparent from the description and drawings, and from the claims.

DETAILED DESCRIPTION

Figure 1:
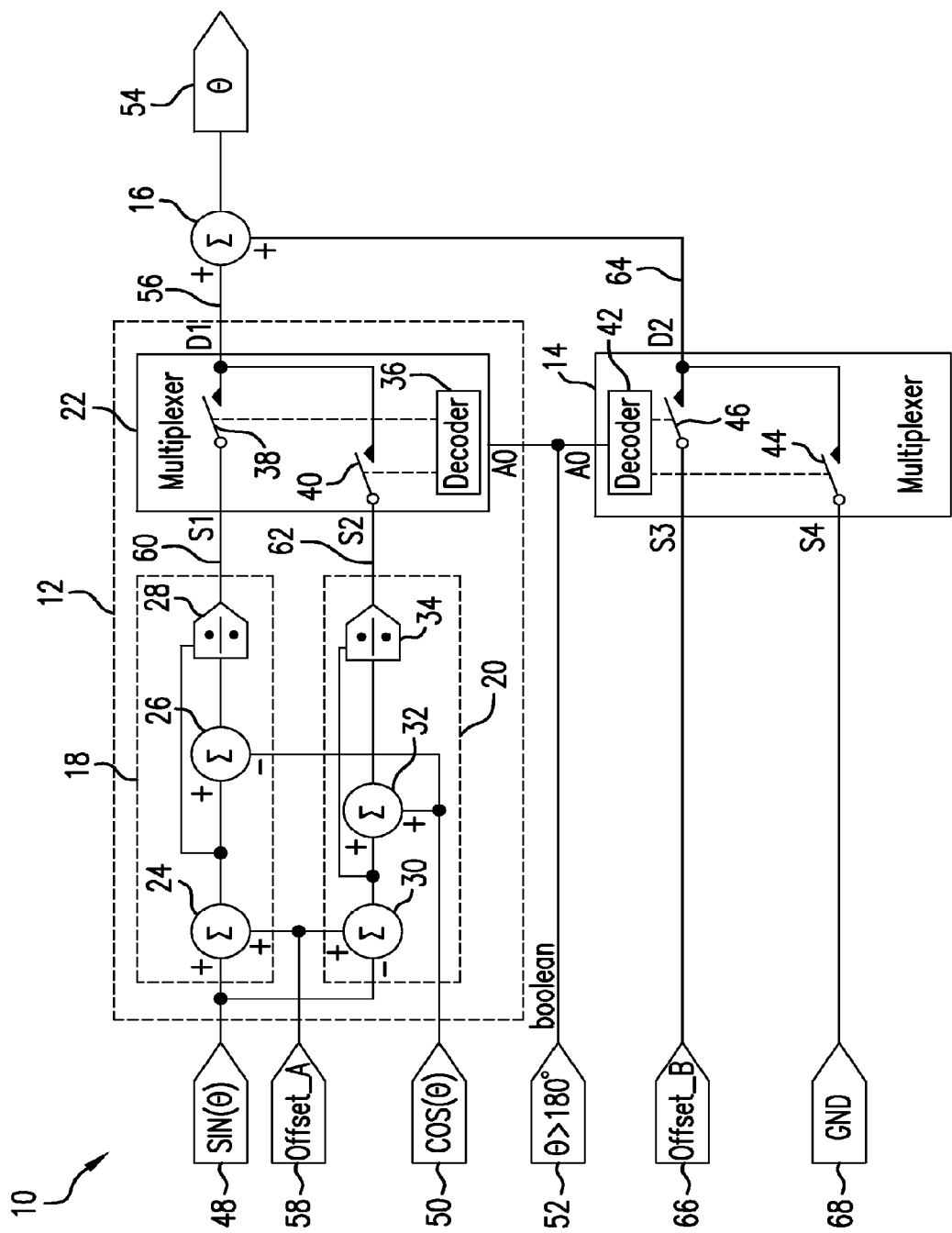
FIG. 1 is a schematic illustrating an example decoder device according to this disclosure.

This disclosure is directed to analog techniques for decoding two or more signals that vary sinusoidally with respect to a parameter value to produce a decoded signal where each value of the decoded signal maps to a unique parameter value. In some examples, the techniques may use arithmetic operations to generate one or more signals that vary with respect to the parameter value in a substantially linear fashion over one or more intervals of the parameter value. The one or more linearly varying signals may be used to produce an output signal where each value of the output signals maps to a unique parameter value.

In a first example, two different sets of arithmetic operations may be used to generate two different signals that vary in a substantially linear fashion with respect to the parameter value in different parameter value intervals. These signals may be referred to as candidate intermediate signals. The different parameter value intervals where the candidate intermediate signals are linear may overlap for one or more intervals of parameter values that define one or more overlap regions.

In some implementations of the first example, each candidate intermediate signal may be associated with a respective offset value. For a given overlap region, the sum of a first candidate intermediate signal and the offset value associated with the first candidate intermediate signal may be substantially equal to the sum of a second candidate intermediate signal and the offset value associated with the second candidate intermediate signal. A signal indicative of the half-phase occupied by the parameter value may used to select which of the two different candidate intermediate signals and associated offset values to use to generate the decoded output signal. Each transition between the two-half phases may be defined to occur within an interval of parameter values that defines a transition region. The set of parameter values that define a particular overlap region may encompass the set of parameter values that define a corresponding transition region. In other words, each parameter value within a transition region may be included within the set of parameter values that define a corresponding overlap region. The transitions between half-phases, in some examples, may vary within a transition region due to an error tolerance within the sensor generating the signal indicative of the half-phase. By producing candidate intermediate signals and associated offset values that have substantially equal sums, a decoder device may be insensitive to such variances in the signal indicative of the half-phase.

In additional implementations of the first example, each candidate intermediate signal may be associated with two different offset values. For a given overlap region, the sum of a first candidate intermediate signal and one of the offset values associated with the first candidate intermediate signal may be substantially equal to the sum of a second candidate intermediate signal and one of the offset values associated with the second candidate intermediate signal. Two signals indicative of the half-phase occupied by the parameter value within different half-phase partitions may used to select which of the two different candidate intermediate signals and associated offset values to use to generate the decoded output signal. The signals taken together may provide quadrant information indicative of a quadrant occupied by the parameter value. Each transition between the four quadrants may be defined to occur within an interval of parameter values that defines a transition region. The set of parameter values that define a particular overlap region may encompass the set of parameter values that define a corresponding transition region. In other words, each parameter value within a transition region may be included within the set of parameter values that define a corresponding overlap region. The transitions between quadrants, in some examples, may vary within a transition region due to an error tolerance within the sensors generating the signals indicative of the half-phases. By producing candidate intermediate signals and associated offset values that have substantially equal sums, a decoder device may be insensitive to such variances in the signals indicative of the half-phases.

FIG. 1 is a schematic illustrating an example decoder device 10 according to this disclosure. Decoder device 10 is configured to generate a output signal 54 based on sinusoidal signal 48, sinusoidal signal 50 and half-phase signal 52. In some examples, sinusoidal signals 48 and 50 may vary sinusoidally with respect to a parameter value, and decoder device 10 may be configured to generate output signal 54 such that output signal 54 varies in a substantially linear fashion with respect to the parameter value. Decoder device 10 includes an intermediate signal generator 12, an offset value selector 14 and a summation node 16.

Intermediate signal generator 12 is configured to generate an intermediate signal 56 based on sinusoidal signal 48, sinusoidal signal 50 and half-phase signal 52. Intermediate signal generator 12 includes a first input terminal electrically coupled to sinusoidal signal 48, a second input terminal electrically coupled to sinusoidal signal 50, and a third input terminal electrically coupled to half-phase signal 52. In some examples, intermediate signal generator 12 may include a fourth input terminal electrically coupled to offset value 58. In other examples, offset value 58 may be produced internally within intermediate signal generator 12. In any case, intermediate signal generator 12 may generate intermediate signal 56 based on offset value 58 in addition to sinusoidal signal 48 and sinusoidal signal 50.

Sinusoidal signals 48 and 50 may each vary sinusoidally with respect to a sensed parameter value. Together, sinusoidal signals 48 and 50 may be indicative of the parameter value. In some examples, the parameter value may be an angle within an angular spectrum, e.g., a 360 degree angular spectrum. For example, the angle may be indicative of the angular position of a magnetic field, a rotary, an electrical resolver, or any other type of information represented by an angle.

In some examples, sinusoidal signal 48 may vary with respect to the parameter value according to a first sinusoidal function and sinusoidal signal 50 may vary with respect to the parameter value according to a second sinusoidal function. As used herein, a sinusoidal function may refer to a function that oscillates like a sine function or a cosine function with respect to the parameter value. The sine function or cosine function may be shifted, stretched and/or compressed. Each of the sinusoidal functions associated with sinusoidal signal 48 and sinusoidal signal 50 may have a period and a phase. A period, as used herein, may refer to the length of an interval of parameter values that contains one full cycle or repetition of the sinusoidal function. The phase, as used herein, may refer to where in the oscillation cycle a particular sinusoidal function begins.

In further examples, the period of the first sinusoidal function may be substantially equal to the period of the second sinusoidal function. In additional examples, the phase of the first sinusoidal function may be different from the phase of the second sinusoidal function. The type of sinusoidal function for the first sinusoidal function may, in some examples, be different from the type of sinusoidal function for the second sinusoidal function. For example, the first sinusoidal function may be a sine wave and the second sinusoidal function may be a cosine wave. It is recognized, however, that each of these different types of sinusoidal functions may be rewritten as the same type of sinusoidal function with an appropriate phase shift.

As shown in the specific example of FIG. 1, sinusoidal signal 48 varies with respect to a parameter value, $\theta$, according to a $\sin \theta$ sinusoidal function, and sinusoidal signal 50 varies with respect to the parameter value, $\theta$, according to the $\cos \theta$ sinusoidal function. Thus, in the specific example of FIG. 1, sinusoidal signal 48 and sinusoidal signal 50 vary with respect to $\theta$ according to sinusoidal functions that have substantially equal periods of 360 degrees. Because the $\cos \theta$ function is equivalent to a phase-shifted version of the $\sin \theta$ function, sinusoidal signal 48 and sinusoidal signal 50 may be said to vary with respect to $\theta$ according to sinusoidal functions that have different phases.

In the example configuration shown in FIG. 1, intermediate signal generator 12 includes transfer function circuits 18, 20, and a candidate intermediate signal selector 22. Transfer function circuit 18 is configured to generate candidate intermediate signal 60 based on sinusoidal signal 48, sinusoidal signal 50 and offset value 58. In some examples, candidate intermediate signal 60 may vary with respect to the parameter value in a substantially linear fashion for a particular range or interval of parameter values. In other words, for a particular interval of parameter values, as the parameter value varies, candidate intermediate signal 60 may vary according to a function that has a substantially constant slope over the particular interval. In some implementations, the length of the interval of parameter values for which candidate intermediate signal 60 varies in a substantially linear fashion may be greater than the length of the interval of parameter values for which either of sinusoidal signals 48 and 50 approximates a linear function. For example, the length of the interval may be greater than or equal to 180 degrees.

Transfer function circuit 20 is configured to generate candidate intermediate signal 62 based on sinusoidal signal 48, sinusoidal signal 50 and offset value 58. Similar to candidate intermediate signal 60, candidate intermediate signal 62 may vary with respect to the parameter value in a substantially linear fashion for a particular range of parameter values. In some implementations, the length of the interval of parameter values for which candidate intermediate signal 60 varies in a substantially linear fashion may be greater than the length of the interval of parameter values for which either of sinusoidal signals 48 and 50 approximates a linear function. For example, the length of the interval may be greater than or equal to 180 degrees. In some examples, the interval of parameter values for which candidate intermediate signal 60 varies in a substantially linear fashion may be different from the interval of parameter values for which candidate intermediate signal 62 varies in a substantially linear fashion.

Figure 2:
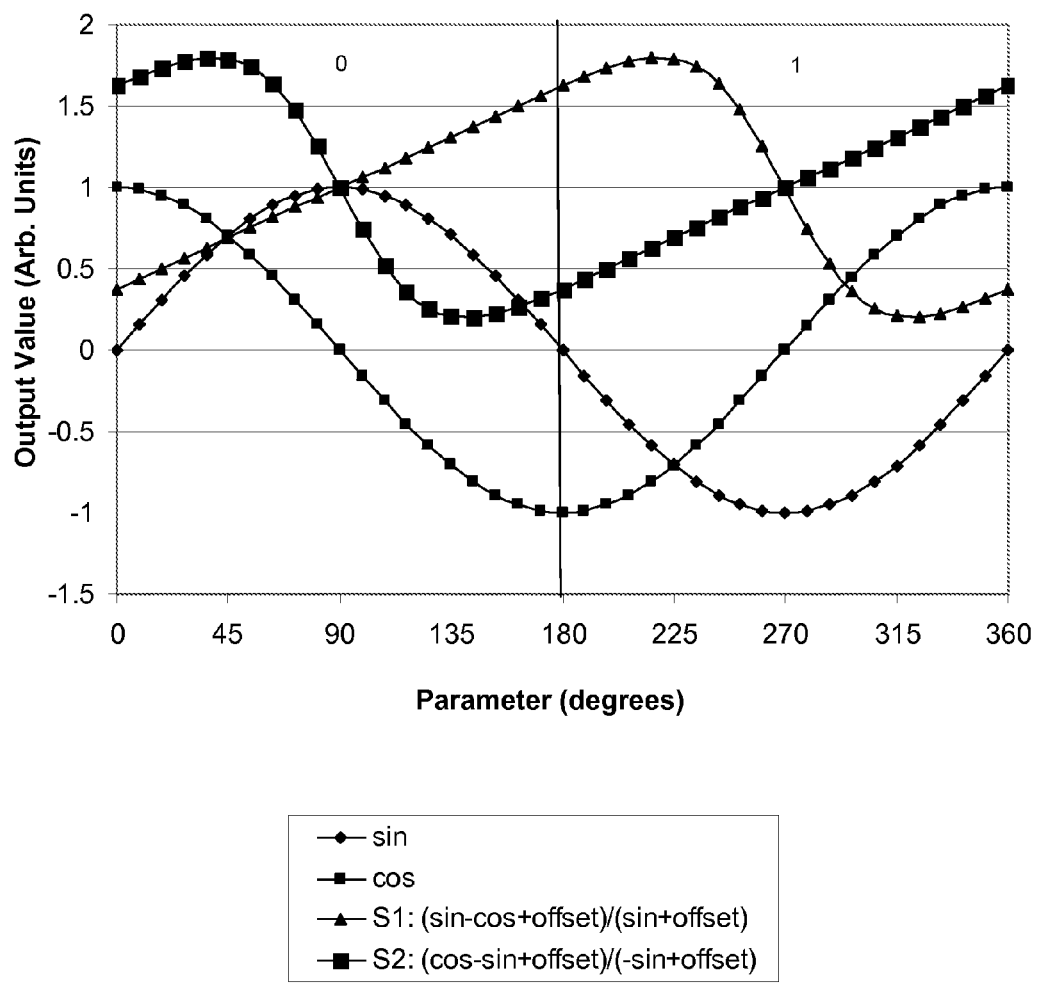
FIG. 2 is a graph illustrating input signals and transfer functions for the example decoder device of FIG. 1 according to this disclosure.

As shown in FIG. 2, for the specific example decoder device 10 of FIG. 1, candidate intermediate signals 60 (S1) and 62 (S2) each vary linearly with respect to the parameter value for at least one-half of the period of sinusoidal signals 48 and 50. More specifically, candidate intermediate signal 60 (S1) is substantially linear over an interval of parameter values that includes parameter values within the range of 0 degrees to 180 degrees. Meanwhile, candidate intermediate signal 62 (S2) is substantially linear over an interval of parameter values that includes parameter values within the range of 180 degrees to 360 degrees. As shown in FIG. 2, the interval of parameter values over which candidate intermediate signal 60 (S1) and candidate intermediate signal 62 (S2) are substantially linear also includes parameter values that extend outside of the ranges identified above in either direction.

Referring back to FIG. 1, transfer function circuit 18 performs one or more arithmetic operations to generate candidate intermediate signal 60. The one or more arithmetic operations may include operations, such as, e.g., addition, subtraction, multiplication and/or division. In the example transfer function circuit 18 of FIG. 1, transfer function circuit 18 generates candidate intermediate signal 60 according to the following transfer function:

$$S1 = \frac{\sin\theta - \cos\theta + \text{off}}{\sin\theta + \text{off}} \quad (1)$$

where S1 corresponds to candidate intermediate signal 60, θ corresponds to the parameter value, sin θ corresponds to sinusoidal signal 48, cos θ corresponds to sinusoidal signal 50, and off corresponds to offset value 58.

Transfer function circuit 20 performs one or more arithmetic operations to generate candidate intermediate signal 62. The set of arithmetic operations performed by transfer function circuit 20 may be different than the set of arithmetic operations performed by transfer function circuit 18. In the particular example of FIG. 1, transfer function circuit 20 generates candidate intermediate signal 62 according to the following transfer function:

$$S2 = \frac{\cos\theta - \sin\theta + \text{off}}{-\sin\theta + \text{off}} \quad (2)$$

where S2 corresponds to candidate intermediate signal 62, θ corresponds to the parameter value, sin θ corresponds to sinusoidal signal 48, cos θ corresponds to sinusoidal signal 50, and off corresponds to offset value 58.

In some examples, offset value 58 may be substantially constant, e.g., offset value 58 may be a substantially constant voltage. Offset value 58 may be selected such that S1 and S2 both include linear regions that are greater than or equal to 180 degrees. For example, offset value 58 may be within the range of approximately 1 to approximately 10 times the amplitude of one or both of sinusoidal signals 48 and 50. In some examples, offset value 58 may be substantially equal to 1.6 times the amplitude of one or both of sinusoidal signals 48 and 50 in order to provide candidate intermediate signals 60 and 62 that have a high degree of linearity. Other values for offset value 58, however, may be selected to adjust the slope and/or linearity of candidate intermediate signals 60 and 62. In additional examples, offset value 58 and offset voltage 66 may be selected such that the product of offset value 58 and offset voltage 66 is approximately equal to 2 times the amplitude of sinusoidal signals 48 and 50 in order to provide an output signal 54 with a high degree of linearity. In such examples, offset value 58 may be adjusted to control the value of offset voltage 66 needed to maintain the product of approximately 2 times the amplitude of sinusoidal signals 48 and 50.

Transfer functions (1) and (2) represent sinusoidal signals 48 and 50 as sinusoidal functions with respect to the parameter value. These transfer functions may be rewritten without the parameter value to better illustrate the operations that may be implemented by transfer function circuit 18 and transfer function circuit 20. For example, transfer function circuit 18 may be configured to generate candidate intermediate signal 60 according to the following transfer function:

$$S1 = \frac{A - B + \text{off}}{A + \text{off}} \quad (3)$$

where S1 corresponds to candidate intermediate signal 60, A corresponds to sinusoidal signal 48, B corresponds to sinusoidal signal 50, and off corresponds to offset value 58. Similarly, transfer function circuit 20 may be configured to generate candidate intermediate signal 62 according to the following transfer function:

$$S2 = \frac{B - A + \text{off}}{-A + \text{off}} \quad (2)$$

where S2 corresponds to candidate intermediate signal 62, A corresponds to sinusoidal signal 48, B corresponds to sinusoidal signal 50, and off corresponds to offset value 58.

In the example decoder device 10 of FIG. 1, transfer function circuit 18 includes a summation unit 24, a subtraction unit 26 and a divider unit 28, and transfer function circuit 20 includes a subtraction unit 30, a summation unit 32 and a divider unit 34. Summation units 24 and 32 are each configured to add two input values to produce an output value that is equal to the sum of the two input values. Subtraction units 26 and 30 are each configured to subtract a second input value from a first input value to produce an output value that is equal to the difference between the two input values.

Summation unit 24 includes a first addend input terminal electrically coupled to sinusoidal signal 48, a second addend input terminal electrically coupled to offset value 58, and an output terminal. Subtraction unit 26 includes a minuend input terminal electrically coupled to the output terminal of summation unit 24, a subtrahend input terminal electrically coupled to sinusoidal signal 50, and an output terminal. Subtraction unit 30 includes a minuend input terminal electrically coupled to offset value 58, a subtrahend input terminal electrically coupled to sinusoidal signal 48, and an output terminal. Summation unit 32 includes a first addend input terminal electrically coupled to the output terminal of subtraction unit 30, a second addend terminal electrically coupled to sinusoidal signal 50, and an output terminal.

Divider units 28 and 34 are each configured to divide a first input value by a second input value to produce an output value that is equal to the quotient of the first input value divided by the second input value. Divider unit 28 includes a dividend input terminal electrically coupled to the output terminal of subtraction unit 26, a divisor input terminal electrically coupled to the output terminal of summation unit 24, and an output terminal electrically coupled to candidate intermediate signal selector 22. Divider unit 34 includes a dividend input terminal electrically coupled to the output terminal of summation unit 32, a divisor input terminal electrically coupled to the output terminal of subtraction unit 30, and an output terminal electrically coupled to candidate intermediate signal selector 22. The output terminal of divider unit 28 may form the output terminal of transfer function circuit 18 that outputs candidate intermediate signal 60, and the output terminal of divider unit 34 may form the output terminal of transfer function circuit 20 that outputs candidate intermediate signal 62.

Half-phase signal 52 may be a signal that is indicative of a half-phase occupied by the parameter value. As used herein, a half-phase may refer to a sub-interval of an interval of parameter values spanning one period of one or both of sinusoidal signal 48 and sinusoidal signal 50. For example, an interval of parameter values spanning one period of sinusoidal signal 48 and/or sinusoidal signal 50 may be sub-divided or partitioned into two sub-intervals according to a half-phase partition. Each of these sub-intervals may be referred to as a half-phase within the half-phase partition.

In some examples, half-phase signal 52 may be a digital signal that takes on one of two different binary logic values. In other examples, half-phase signal 52 may be an analog signal, and decoder device 10 may use a comparator or other analog-to-digital converter to generate a digital signal indicative of the half-phase occupied by the parameter value.

In further examples, half-phase signal 52 may be generated by a component external to decoder device 10. For example, an analog or digital Hall sensor may be used to generate half-phase signal 52. In additional examples, half-phase signal 52 may be generated by decoder device 10 using either sinusoidal signal 48 or sinusoidal signal 50. For example, a comparator (not shown) may be used to compare sinusoidal signal 48 to a threshold value and generate half-phase signal 52 based on the comparison.

In the specific example of FIG. 1, the first half-phase corresponds to parameter values, θ, where 0°≤θ≤180° and the second half-phase corresponds to parameter values, θ, where 180°<θ≤360°. In other examples, however, the half-phases may be partitioned differently and the transitions between half-phases may occur at different parameter values. In addition, although the half-phases used for the example of FIG. 1 are equal in length, i.e., 180 degrees, the half-phases need not necessarily be equal in length.

Candidate intermediate signal selector 22 is configured to select one of candidate intermediate signal 60 and candidate intermediate signal 62 to output as intermediate signal 56 based on half-phase signal 52. Candidate intermediate signal selector 22 selects candidate intermediate signal 60 to output as intermediate signal 56 if half-phase signal 52 indicates that the parameter value occupies a first half-phase. Otherwise, if half-phase signal 52 indicates that the parameter value occupies a second half-phase, candidate intermediate signal selector 22 selects candidate intermediate signal 62 to output as intermediate signal 56. Candidate intermediate signal selector 22 includes a first input terminal electrically coupled to the output terminal of transfer function circuit 18, a second input terminal electrically coupled to the output terminal of transfer function circuit 20, a control terminal electrically coupled to half-phase signal 52, and an output terminal that may form the output terminal of intermediate signal generator 12 that outputs intermediate signal 56.

Candidate intermediate signal selector 22 includes decoder 36 and switches 38 and 40. Decoder 36 may control switches 38 and 40 to direct one of candidate intermediate signal 60 or candidate intermediate signal 62 to the output terminal of candidate intermediate signal selector 22 based on half-phase signal 52. For example, decoder 36 may close switch 38 and open switch 40 if half-phase signal 52 indicates a first half-phase, and open switch 38 and close switch 40 if half-phase signal 52 indicates a second half-phase. In some examples, candidate intermediate signal selector 22 may be referred to as a multiplexer.

Offset value selector 14 is configured to generate an offset value 64 based on half-phase signal 52. For example, offset value selector 14 may select one of offset voltage 66 and ground voltage 68 to output as offset value 64 based on half-phase signal 52. Offset value selector 14 includes a first input terminal electrically coupled to offset voltage 66, a second input terminal electrically coupled to ground voltage 68, a control terminal electrically coupled to half-phase signal 52, and an output terminal that outputs offset value 64. Offset value selector 14 includes decoder 42 and switches 44 and 46. The operation of decoder 42 and switches 44 and 46 is substantially similar to decoder 36 and switches 38 and 40, respectively, in candidate intermediate signal selector 22 and, in the interest of brevity, will not be described in further detail.

In some examples, the value of offset voltage 66 may be substantially constant. The value of offset voltage 66 may be based on the distance at which the linear regions of S1 and S2 are offset from each other. For example, the value of offset voltage 66 may be within the range of approximately 0.2 to approximately 2 times the amplitude of one or both of sinusoidal signals 48 and 50. In some examples, offset value 58 and offset voltage 66 may be selected such that the product of offset value 58 and offset value 66 is approximately equal to 2 times the amplitude of the sinusoidal signals 48 and 50 in order to provide an output signal 54 with a high degree of linearity. In further examples, the value of offset voltage 66 may be selected such that the value of offset voltage 66 is approximately equal to 1.25 times the amplitude of one or both of sinusoidal signals 48 and 50 when offset value 58 is set to 1.6 times one or both of sinusoidal signals 48 and 50. Ground voltage 68 may be substantially equal to zero volts.

Summation node 16 is configured to add offset value 64 to intermediate signal 56 to produce output signal 54. Summation node 16 includes a first addend input terminal electrically coupled to an output terminal of intermediate signal generator 12, a second addend input terminal electrically coupled to an output terminal of offset value selector 14, and an output terminal. The output terminal of summation node 16 may form the output terminal of decoder device 10 that produces output signal 54.

Figure 3:
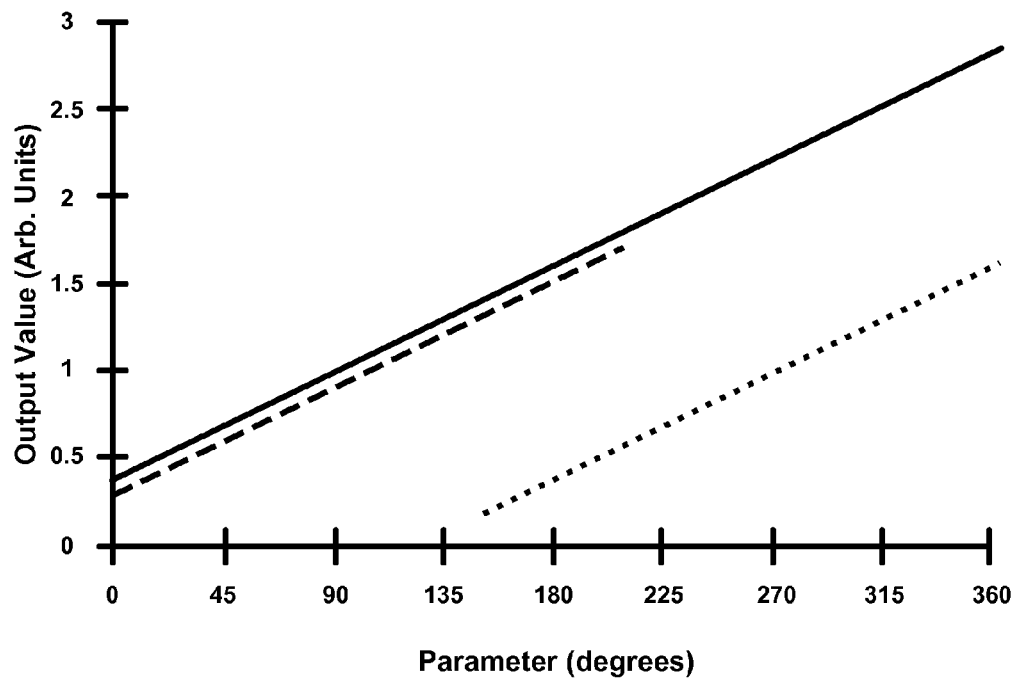
FIG. 3 is a graph illustrating how the example decoder device of FIG. 1 generates an output signal according to this disclosure.
Figure 3:
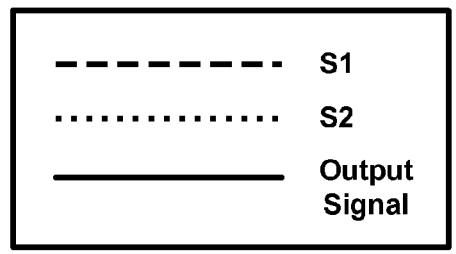

The operation of decoder device 10 will now be described with respect to FIGS. 2 and 3. FIG. 2 is a graph illustrating sinusoidal signals 48 and 50 and transfer functions outputs generated by transfer function circuits 18 and 20 according to this disclosure. FIG. 3 is a graph illustrating how decoder device 10 generates output signal 54 based on intermediate signal 56 and offset value 64 according to this disclosure.

One or more sensing devices sense a parameter value, e.g., an angular position, and produce sinusoidal signal 48, sinusoidal signal 50 and half-phase signal 52. Transfer function circuit 18 applies a first transfer function to the values of sinusoidal signal 48 and sinusoidal signal 50 to generate candidate intermediate signal 60 (S1) illustrated in FIG. 2. Similarly, transfer function circuit 20 applies a second transfer function to the values of sinusoidal signal 48 and sinusoidal signal 50 to generate candidate intermediate signal 62

(S2) illustrated in FIG. 2. Candidate intermediate signal selector 22 selects one of candidate intermediate signal 60 and candidate intermediate signal 62 to output as intermediate signal 56 based on half-phase signal 52.

A first half-phase may be defined to correspond to parameter values, θ, where 0°≤θ≤180° and a second half-phase may be defined to correspond to parameter values, θ, where 180°<θ≤360°. As shown in FIG. 2, candidate intermediate signal 60 is substantially linear in the first half-phase, and candidate intermediate signal 62 is substantially linear in the second half-phase. As such, the information given to candidate intermediate signal selector 22 by half-phase signal 52 allows candidate intermediate signal selector 22 to select whichever of candidate intermediate signal 60 and candidate intermediate signal 62 is currently operating in a linear region.

Meanwhile, offset value selector 14 selects one of offset voltage 66 and ground voltage 68 as offset value 64 to add to intermediate signal 56. Summation node 16 adds offset value 64 to intermediate signal 56 to produce output signal 54. Each value in output signal 54 may map to a unique parameter value within a single period of sinusoidal signals 48 and 50. In this manner, decoder device 10 may implement a two-input arctangent function to decode two sinusoidal input signals without needing to use sequential circuit elements or look-up tables.

As used herein, sequential circuit elements may refer to circuit elements that retain a particular state after the inputs to the circuit elements are unasserted. Decoder device 10 may, in some examples, use non-sequential circuit elements to implement the two-input arctangent function. As used herein, non-sequential circuit elements refer to circuit elements that do not retain a particular state after the inputs to the circuit elements are unasserted.

In some examples, output signal 54 may vary with respect to the parameter value in a substantially linear fashion for at least the period of sinusoidal signal 48 and/or sinusoidal signal 50. In such examples, decoder 10 is able to provide a linear output that is indicative of the parameter value without the need to use look-up tables.

As shown in FIG. 3, candidate intermediate signal 60 (S1) and candidate intermediate signal 62 (S2) may each be substantially linear within different parameter intervals. The linear parameter intervals for candidate intermediate signal 60 may overlap with the linear parameter intervals for candidate intermediate signal 62 defining one or more overlap regions. Candidate intermediate signal 60 and candidate intermediate signal 62 may each be associated with a respective offset value. For a given overlap region, the sum of candidate intermediate signal 60 and the offset value associated with candidate intermediate signal 60 may be substantially equal to the sum of candidate intermediate signal 62 and the offset value associated with candidate intermediate signal 62. Half-phase signal 52 may provide half-phase information indicative of a half-phase occupied by the parameter value and be used to select which of the two different candidate intermediate signals and associated offset values to use to generate the decoded output signal 54. Each transition between the two half-phases may be defined to occur within an interval of parameter values that defines a transition region. The set of parameter values that define a particular overlap region may encompass the set of parameter values that define a corresponding transition region. In other words, each parameter value within a transition region may be included within the set of parameter values that define a corresponding overlap region. The transitions between half-phases, in some examples, may vary within a transition region due to an error tolerance within the sensor generating half-phase 52. By producing candidate intermediate signals and associated offset values that have substantially equal sums, decoder device 10 may be insensitive to variances in the transitions of half-phase signal 52 that are within the overlapping regions.

It should be noted that for angles proximate to the half-phase transition at 0 degrees and 360 degrees, two different outputs may occur. However, output signal 54 may still be indicative of a unique parameter value because each of these two signals can be mapped to a single parameter value within a 360 degree interval. In addition, when output signal 54 is said to vary with respect to the parameter value in a substantially linear fashion over a full period of the parameter value, such a variance may include the understanding that angles proximate to the 0/360 degree half-phase transition may map to portions of output signal 54 that extend beyond the maximum and minimum values for output signal 54 shown in FIG. 3. Any of these outlier values may be mapped to a region within the 360 degree interval shown in FIG. 3 by applying a modulus operation followed by an offset operation to output signal 54 with the modulus equal to the value of output signal 54 at 360 degrees minus the value of output signal 54 at zero degrees and the offset equal to the value of output signal 54 at zero degrees.

FIG. 3 illustrates candidate intermediate signal 60 and output signal 54 as being separated by a small offset. However, in additional examples, candidate intermediate signal 60 may substantially overlap output signal 54, i.e., not be separated from output signal 54 by an offset.

Figure 4:
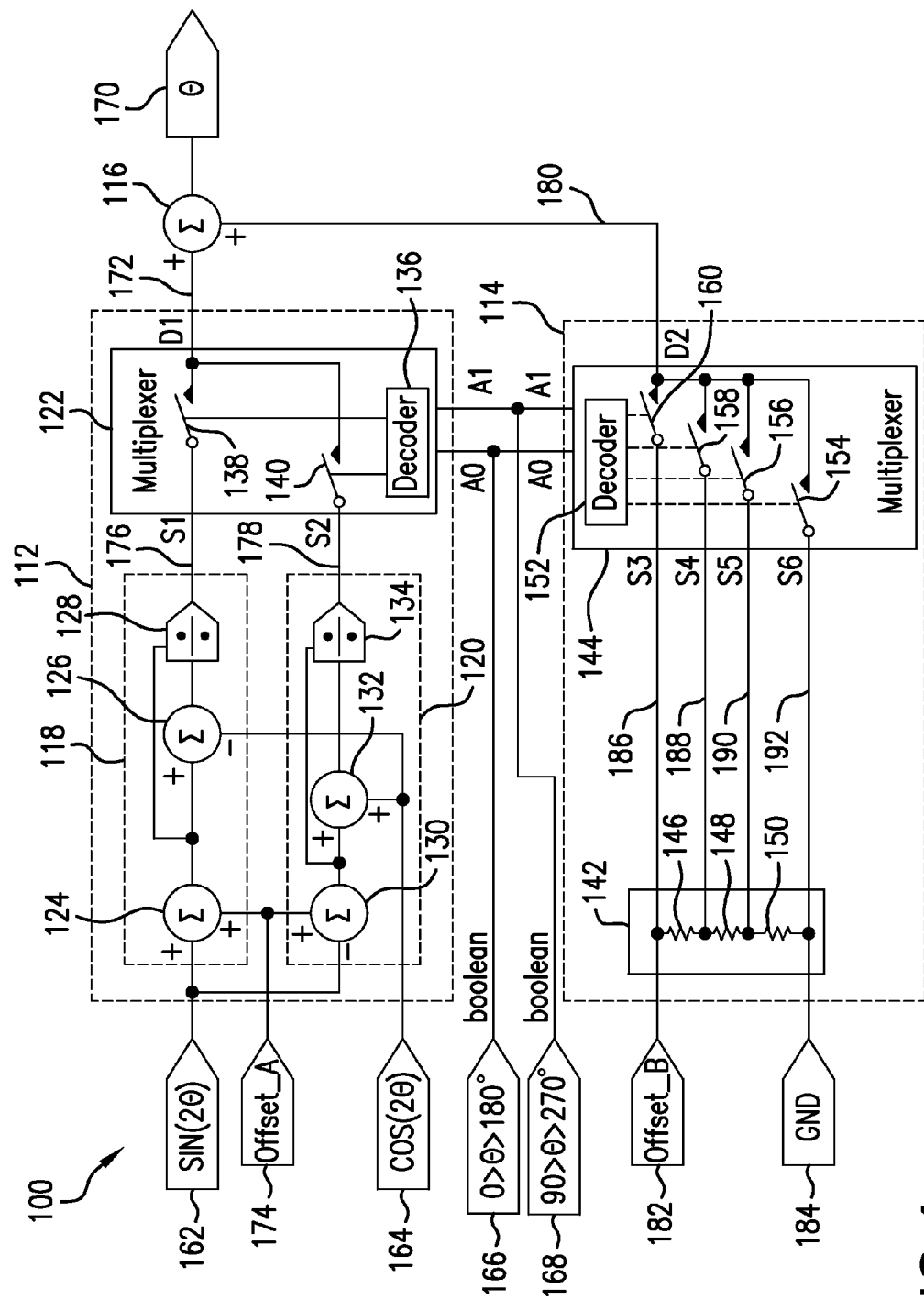
FIG. 4 is a schematic illustrating another example decoder device according to this disclosure.

FIG. 4 is a schematic illustrating an example decoder device 100 according to this disclosure. Decoder device 100 is configured to generate output signal 170 based on sinusoidal signal 162, sinusoidal signal 164, half-phase signal 166 and half-phase signal 168. In some examples, sinusoidal signals 162 and 164 may vary sinusoidally with respect to a parameter value, and decoder device 100 may be configured to generate output signal 170 such that output signal 170 varies in a substantially linear fashion with respect to the parameter value. Decoder device 100 includes an intermediate signal generator 112, an offset value generator 114 and a summation node 116.

Intermediate signal generator 112 is configured to generate an intermediate signal 172 based on sinusoidal signal 162, sinusoidal signal 164, half-phase signal 166 and half-phase signal 168. Intermediate signal generator 112 includes a first input terminal electrically coupled to sinusoidal signal 162, a second input terminal electrically coupled to sinusoidal signal 164, a third input terminal electrically coupled to half-phase signal 166, and a fourth input terminal electrically coupled to half-phase signal 168. In some examples, intermediate signal generator 112 may include a fifth input terminal electrically coupled to offset value 174. In other examples, offset value 174 may be produced internally within intermediate signal generator 112. In any case, intermediate signal generator 112 may generate intermediate signal 172 based on offset value 174 in addition to sinusoidal signals 162 and 164. In the example decoder device 100 of FIG. 4, intermediate signal generator 112 includes transfer function circuits 118 and 120, and a candidate intermediate signal selector 122.

Sinusoidal signal 162 and sinusoidal signal 164 may be signals that are together indicative of a parameter value. In some examples, the parameter value may be an angle within an angular spectrum, e.g., a 360 degree angular spectrum. For example, the angle may be indicative of the angular position of a magnetic field, a rotary, an electrical resolver, or any other type of information represented by an angle.

In some examples, sinusoidal signal 162 may vary with respect to the parameter value according to a first sinusoidal function and sinusoidal signal 164 may vary with respect to the parameter value according to a second sinusoidal function. As used herein, a sinusoidal function may refer to a function that oscillates like a sine function or a cosine function with respect to the parameter value. The sine function or cosine function may be shifted, stretched and/or compressed. Each of the sinusoidal functions associated with sinusoidal signal 162 and sinusoidal signal 164 may have a period and a phase. A period, as used herein, may refer to the length of an interval of parameter values that contains one full cycle or repetition of the sinusoidal function. The phase, as used herein, may refer to where in the oscillation cycle a particular sinusoidal function begins.

In further examples, the period of the first sinusoidal function may be substantially equal to the period of the second sinusoidal function. In additional examples, the phase of the first sinusoidal function may be different from the phase of the second sinusoidal function. The type of sinusoidal function for the first sinusoidal function may, in some examples, be different from the type of sinusoidal function for the second sinusoidal function. For example, the first sinusoidal function may be a sine wave and the second sinusoidal function may be a cosine wave. It is recognized, however, that each of these different types of sinusoidal functions may be rewritten as the same type of sinusoidal function with an appropriate phase shift.

As shown in the specific example of FIG. 4, sinusoidal signal 162 varies with respect to a parameter value, $\theta$, according to a $\sin 2\theta$ sinusoidal function, and sinusoidal signal 164 varies with respect to the parameter value, $\theta$, according to the $\cos 2\theta$ sinusoidal function. Thus, in the specific example of FIG. 4, sinusoidal signal 162 and sinusoidal signal 164 vary with respect to $\theta$ according to sinusoidal functions that have substantially equal periods of 180 degrees. Because the cos $2\theta$ function is equivalent to a phase-shifted version of the sin $2\theta$ function, sinusoidal signal 162 and sinusoidal signal 164 may be said to vary with respect to $\theta$ according to sinusoidal functions that have different phases.

In the example configuration shown in FIG. 4, intermediate signal generator 112 includes a transfer function circuit 118, a transfer function circuit 120, and a candidate intermediate signal selector 122. Transfer function circuit 118 is configured to generate candidate intermediate signal 176 based on sinusoidal signal 162, sinusoidal signal 164 and offset value 174. In some examples, candidate intermediate signal 176 may vary with respect to the parameter value in a substantially linear fashion for one or more ranges or intervals of parameter values. In other words, for a particular interval of parameter values, as the parameter value varies, candidate intermediate signal 176 may vary according to a function that has a substantially constant slope over the particular interval. In some implementations, the length of the interval of parameter values for which candidate intermediate signal 176 varies in a substantially linear fashion may be greater than the length of the interval of parameter values for which either of sinusoidal signals 162 and 164 approximates a linear function. For example, the length of the interval may be greater than or equal to 90 degrees.

Transfer function circuit 120 is configured to generate candidate intermediate signal 178 based on sinusoidal signal 162, sinusoidal signal 164 and offset value 174. Similar to candidate intermediate signal 176, candidate intermediate signal 178 may vary with respect to the parameter value in a substantially linear fashion for one or more ranges or intervals of parameter values. In some implementations, the length of the interval of parameter values for which candidate intermediate signal 178 varies in a substantially linear fashion may be greater than the length of the interval of parameter values for which either of sinusoidal signals 162 and 164 approximates a linear function. For example, the length of the interval may be greater than or equal to 90 degrees.

The one or more intervals of parameter values over which candidate intermediate signal 178 is substantially linear may be different from the one or more intervals over which candidate intermediate signal 176 is substantially linear. However, these intervals may be overlapping within one or more sub-intervals.

Figure 5:
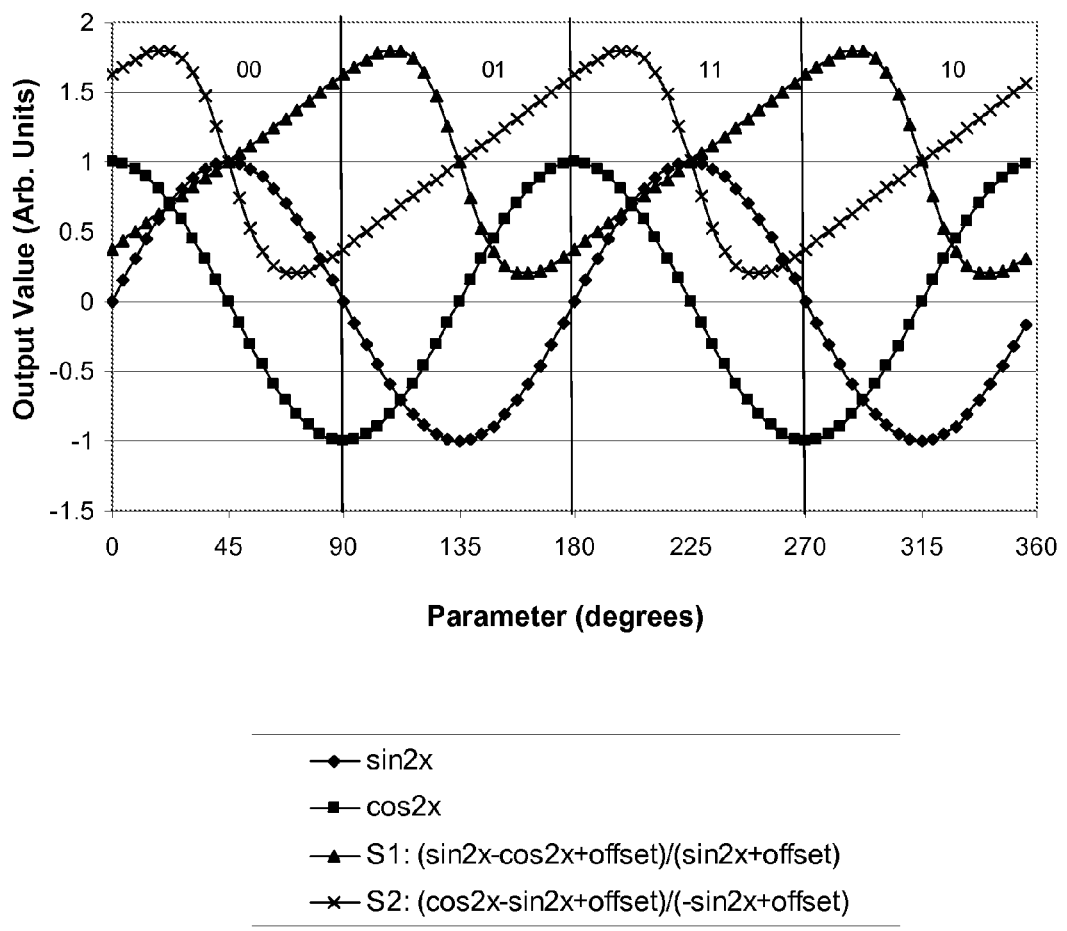
FIG. 5 is a graph illustrating input signals and transfer functions for the example decoder device of FIG. 4 according to this disclosure.

As shown in FIG. 5, for the specific example decoder device 100 of FIG. 4, candidate intermediate signals 176 (S1) and 178 (S2) each vary linearly with respect to the parameter value for at least one-half of the period of sinusoidal signals 162 and 164. More specifically, candidate intermediate signal 176 (S1) is substantially linear over a first interval of parameter values that includes parameter values within the range of 0 degrees to 90 degrees and a second interval of parameter values that includes parameter values within the range of 180 degrees to 270 degrees as shown in FIG. 5. Meanwhile, candidate intermediate signal 178 (S2) is substantially linear over a first interval of parameter values that includes parameter values within the range of 90 degrees to 180 degrees and a second interval of parameter values that includes parameter values within the range of 270 degrees to 360 degrees. As shown in FIG. 5, the intervals of parameter values over which candidate intermediate signal 176 (S1) and candidate intermediate signal 178 (S2) are substantially linear may also include parameter values that extend outside of the ranges identified above in either direction.

Referring back to FIG. 4, transfer function circuit 118 performs one or more arithmetic operations to generate candidate intermediate signal 176. In particular, transfer function circuit 118 generates candidate intermediate signal 176 according to the following transfer function:

$$S1 = \frac{\sin 2\theta - \cos 2\theta + \text{off}}{\sin 2\theta + \text{off}} \qquad (5)$$

where S1 corresponds to candidate intermediate signal 176, $\theta$ corresponds to the parameter value, $\sin 2\theta$ corresponds to sinusoidal signal 162, $\cos 2\theta$ corresponds to sinusoidal signal 164, and off corresponds to offset value 174.

Transfer function circuit 120 performs one or more arithmetic operations to generate candidate intermediate signal 178. The set of arithmetic operations performed by transfer function circuit 120 may be different than the set of arithmetic operations performed by transfer function circuit 118. In the particular example of FIG. 4, transfer function circuit 120 generates candidate intermediate signal 178 according to the following transfer function:

$$S2 = \frac{\cos 2\theta - \sin 2\theta + \text{off}}{-\sin 2\theta + \text{off}} \qquad (6)$$

where S2 corresponds to candidate intermediate signal 178, $\theta$ corresponds to the parameter value, $\sin 2\theta$ corresponds to sinusoidal signal 162, $\cos 2\theta$ corresponds to sinusoidal signal 164, and off corresponds to offset value 174.

In some examples, offset value 174 may be substantially constant, e.g., offset value 174 may be a substantially constant voltage. Offset value 174 may be selected such that S1 and S2 both include linear regions that are greater than or equal to 90 degrees. For example, offset value 174 may be within the range of approximately 1 to approximately 10 times the amplitude of one or both of sinusoidal signals 162 and 164. In some examples, offset value 174 may be substantially equal to 1.6 times the amplitude of one or both of sinusoidal signals 162 and 164 in order to provide candidate intermediate signals 176 and 178 that have a high degree of linearity. Other values for offset value 174, however, may be selected to adjust the slope and/or linearity of candidate intermediate signals 176 and 178. In additional examples, offset value 174 and offset voltage 182 may be selected such that the product of offset voltage 182 divided by 3 and offset value 174 is approximately equal to 2 times the amplitude of sinusoidal signals 162 and 164 in order to provide an output signal 170 with a high degree of linearity. In such examples, offset value 174 may be adjusted to control the value of offset voltage 182 needed to maintain the product of approximately 2 times the amplitude of the sinusoidal signals 162 and 164.

Transfer functions (5) and (6) represent sinusoidal signal 162 and sinusoidal signal 164 as sinusoidal functions with respect to the parameter value. These transfer functions may be rewritten without the parameter value to better illustrate the operations that may be implemented by transfer function circuit 118 and transfer function circuit 120. For example, transfer function circuit 118 may be configured to generate candidate intermediate signal 176 according to the following transfer function:

$$S1 = \frac{A - B + \text{off}}{A + \text{off}} \quad (7)$$

where S1 corresponds to candidate intermediate signal 176, A corresponds to sinusoidal signal 162, B corresponds to sinusoidal signal 164, and off corresponds to offset value 174. Similarly, transfer function circuit 120 may be configured to generate candidate intermediate signal 178 according to the following transfer function:

$$S2 = \frac{B - A + \text{off}}{-A + \text{off}} \quad (8)$$

where S2 corresponds to candidate intermediate signal 178, A corresponds to sinusoidal signal 162, B corresponds to sinusoidal signal 164, and off corresponds to offset value 174.

In the example decoder 100 of FIG. 4, transfer function circuit 118 includes summation unit 124, subtraction unit 126 and divider unit 128, and transfer function circuit 120 includes subtraction unit 130, summation unit 132 and divider unit 134. Summation units 124 and 132 are each configured to add two input values to produce an output value that is equal to the sum of the two input values. Subtraction units 126 and 130 are each configured to subtract a second input value from a first input value to produce an output value that is equal to the difference between the two input values.

Summation unit 124 includes a first addend input terminal electrically coupled to sinusoidal signal 162, a second addend input terminal electrically coupled to offset value 174, and an output terminal. Subtraction unit 126 includes a minuend input terminal electrically coupled to the output terminal of summation unit 124, a subtrahend input terminal electrically coupled to sinusoidal signal 164, and an output terminal. Subtraction unit 130 includes a minuend input terminal electrically coupled to offset value 174, a subtrahend input terminal electrically coupled to sinusoidal signal 162, and an output terminal. Summation unit 132 includes a first addend input terminal electrically coupled to the output terminal of subtraction unit 130, a second addend terminal electrically coupled to sinusoidal signal 164, and an output terminal.

Divider unit 128 and divider unit 134 are each configured to divide a first input value by a second input value to produce an output value that is equal to the quotient of the first input value divided by the second input value. Divider unit 128 includes a dividend input terminal electrically coupled to the output terminal of subtraction unit 126, a divisor input terminal electrically coupled to the output terminal of summation unit 124, and an output terminal electrically coupled to candidate intermediate signal selector 122. Divider unit 134 includes a dividend input terminal electrically coupled to the output terminal of summation unit 132, a divisor input terminal electrically coupled to the output terminal of subtraction unit 132, and an output terminal electrically coupled to candidate intermediate signal selector 122. The output terminal of divider unit 128 may form the output terminal of transfer function circuit 118 that outputs candidate intermediate signal 176, and the output terminal of divider unit 134 may form the output terminal of transfer function circuit 120 that outputs candidate intermediate signal 178.

Half-phase signal 166 may be a signal that is indicative of a half-phase occupied by the parameter value within a first half-phase partition. Half-phase signal 168 may be a signal that is indicative of a half-phase occupied by the parameter value within a second half-phase partition. As used herein, a half-phase may refer to a sub-interval of an interval of parameter values spanning one period of one or both of sinusoidal signal 162 and sinusoidal signal 164. For example, an interval of parameter values spanning one period of sinusoidal signal 162 and/or sinusoidal signal 164 may be sub-divided or partitioned into two sub-intervals according to a half-phase partition. Each of these sub-intervals may be referred to as a half-phase within the half-phase partition.

In some examples, one or both of half-phase signal 166 and half-phase signal 168 may be a digital signal that takes on one of two different binary logic values. In other examples, one or both of half-phase signal 166 and half-phase signal 168 may be an analog signal, and decoder device 100 may use a comparator or other analog-to-digital converter to generate a digital signal indicative of the half-phase occupied by the parameter value. Half-phase signal 166 and half-phase signal 168 may be generated by one or more components external to decoder device 100. For example, one or more analog or digital Hall sensor may be used to generate half-phase signal 166 and/or half-phase signal 168.

In the specific example of FIG. 4, a first half-phase partition may be defined to include a first half-phase that corresponds to parameter values, θ, where 0°≤θ≤180° and a second half-phase that corresponds to parameter values, θ, where 180°<θ≤360°. A second half-phase partition may be defined to include a first half-phase that corresponds to parameter values, θ, where 90°≤θ≤270° and a second half-phase that corresponds to parameter values, θ, where 0°<θ≤90° or 270°<θ≤360°. In other examples, however, the half-phases may be partitioned differently and the transitions between the half-phase may occur at different parameter values. In addition, although the half-phases used for the example of FIG. 4 are equal in length, i.e., 180 degrees, the half-phases need not necessarily be equal in length.

The combination of half-phase information provided by half-phase signals 166 and 168 may be referred to herein as quadrant information. A first quadrant may be defined to correspond to parameter values, θ, where 0°≤θ≤90°, a second quadrant may be defined to correspond to parameter values, θ, where 90°≤θ≤180°, a third quadrant may be defined to correspond to parameter values, θ, where 180°≤θ≤270°, and a fourth quadrant may be defined to correspond to parameter values, θ, where 270°≤θ≤360°. In other examples, however, the quadrants may be partitioned differently and the quadrant transitions may occur at different parameter values. In addition, although the quadrants used for the example of FIG. 4 are equal in length, i.e., 90 degrees, the quadrants need not necessarily be equal in length.

Candidate intermediate signal selector 122 is configured to select one of candidate intermediate signal 176 and candidate intermediate signal 178 to output as intermediate signal 172 based on half-phase signal 166 and half-phase signal 168. In the example configuration of FIG. 4, candidate intermediate signal selector 122 selects candidate intermediate signal 176 to output as intermediate signal 172 if half-phase signal 166 is equal to half-phase signal 168, and candidate intermediate signal selector 122 selects candidate intermediate signal 178 to output as intermediate signal 172 if half-phase signal 166 is not equal to half-phase signal 168. Candidate intermediate signal selector 122 includes a first input terminal electrically coupled to the output terminal of transfer function circuit 118, a second input terminal electrically coupled to the output terminal of transfer function circuit 120, a first control terminal electrically coupled to half-phase signal 166, a second control terminal electrically coupled to half-phase signal 168, and an output terminal that may form the output terminal of intermediate signal generator 112 that outputs intermediate signal 172.

Candidate intermediate signal selector 122 includes decoder 136 and switches 138 and 140. Decoder 136 may control switches 138 and 140 to direct one of candidate intermediate signal 176 or candidate intermediate signal 178 to the output terminal of candidate intermediate signal selector 122 based on half-phase signal 166 and half-phase signal 168. For example, decoder 136 may close switch 138 and open switch 140 if half-phase signal 166 is equal to half-phase signal 168, and open switch 138 and close switch 140 if half-phase signal 166 is not equal to half-phase signal 168.

Offset value generator 114 is configured to generate an offset value 180 based on half-phase signal 166 and half-phase signal 168. Offset value generator 114 includes a first control terminal electrically coupled to half-phase signal 166, and a second control terminal electrically coupled to half-phase signal 168. In some examples, intermediate signal generator 112 may include one or both of an input terminal electrically coupled to offset voltage 182 and an input terminal electrically coupled to ground voltage 184. In other examples, one or both of offset voltage 182 and ground voltage 184 may be produced internally within offset value generator 114. Offset value generator 114 includes an candidate offset value generator 142 and a offset value selector 144.

Candidate offset value generator 142 is configured to generate candidate offset values 186, 188, 190 and 192 based on offset voltage 182 and ground voltage 184. Candidate offset value generator 142 includes a first input terminal electrically coupled to offset voltage 182, a second input terminal electrically coupled to ground voltage 184, and four output terminals each electrically coupled to offset value selector 144. Candidate offset value generator 142 also includes resistances 146, 148 and 150. In some examples, resistances 146, 148 and 150 may have equal resistance values. A first terminal of resistance 146 is electrically coupled to offset voltage 182, and a first output terminal of candidate offset value generator 142. A second terminal of resistance 146 is electrically coupled to a first terminal of resistance 148, and a second output terminal of candidate offset value generator 142. The first terminal of resistance 148 is electrically coupled to the second terminal of resistance 146, and to the second output terminal of candidate offset value generator 142. A second terminal of resistance 148 is electrically coupled to a first terminal of resistance 150, and a third output terminal of candidate offset value generator 142. The first terminal of resistance 150 is electrically coupled to the second terminal of resistance 148, and to the third output terminal of candidate offset value generator 142. A second terminal of resistance 150 is electrically coupled to ground voltage 184, and to a fourth output terminal of candidate offset value generator 142.

In some examples, offset voltage 182 may be substantially constant. The value of offset voltage 182 may be based on the distance at which the linear regions of S1 and S2 are offset from each other. For example, offset voltage 182 may be within the range of approximately 0.2 to approximately 2 times the amplitude of one or both of sinusoidal signals 162 and 164. In some examples, offset value 174 and offset voltage 182 may be selected such that the product of offset value 174 and one third of offset voltage 182 is approximately equal to 2 times the amplitude of the sinusoidal signals 162 and 164 in order to provide an output signal 170 with a high degree of linearity. In further examples, the value of offset voltage 182 may be selected such that the value of offset voltage 182 is approximately equal to 3.75 times the amplitude of one or both of sinusoidal signals 162 and 164 when offset value 174 is set to 1.6 times one or both of sinusoidal signals 162 and 164. Ground voltage 184 may be substantially equal to zero volts.

Offset value selector 144 is configured to generate an offset value 180 based on half-phase signal 166 and half-phase signal 168. For example, offset value selector 144 may select one of candidate offset value 186, candidate offset value 188, candidate offset value 190 and candidate offset value 192 to output as offset value 180 based on half-phase signal 166 and half-phase signal 168. In the example configuration of FIG. 4, offset value selector 144 selects candidate offset value 186 to output as offset value 180 when half-phase signal 166 is equal to a logic one value and half-phase signal 168 is equal to a logic zero value, candidate offset value 188 to output as offset value 180 when half-phase signal 166 is equal to a logic one value and half-phase signal 168 is equal to a logic one value, candidate offset value 190 to output as offset value 180 when half-phase signal 166 is equal to a logic zero value and half-phase signal 168 is equal to a logic one value, candidate offset value 192 to output as offset value 180 when half-phase signal 166 is equal to a logic zero value and half-phase signal 168 is equal to a logic zero value. Offset value selector 144 includes four input terminal each electrically coupled to a respective output terminal of candidate offset value generator 142. Offset value selector 144 also includes an output terminal that may form the output terminal of offset value generator 114 that outputs offset value 180. Offset value selector 144 includes decoder 152, and switches 154, 156, 158 and 160. Decoder 152 may control switches 154, 156, 158 and 160 to direct one of candidate offset value 186, candidate offset value 188, candidate offset value 190 and candidate offset value 192 to the output terminal of offset value selector 144 based on half-phase signal 166 and half-phase signal 168.

Summation node 116 is configured to add offset value 180 to intermediate signal 172 to produce output signal 170. Summation node 116 includes a first addend input terminal electrically coupled to an output terminal of intermediate signal generator 112, a second addend input terminal electrically coupled to an output terminal of offset value generator 114, and an output terminal. The output terminal of summation node 116 may form the output terminal of decoder device 100 that produces output signal 170.

Figure 6:
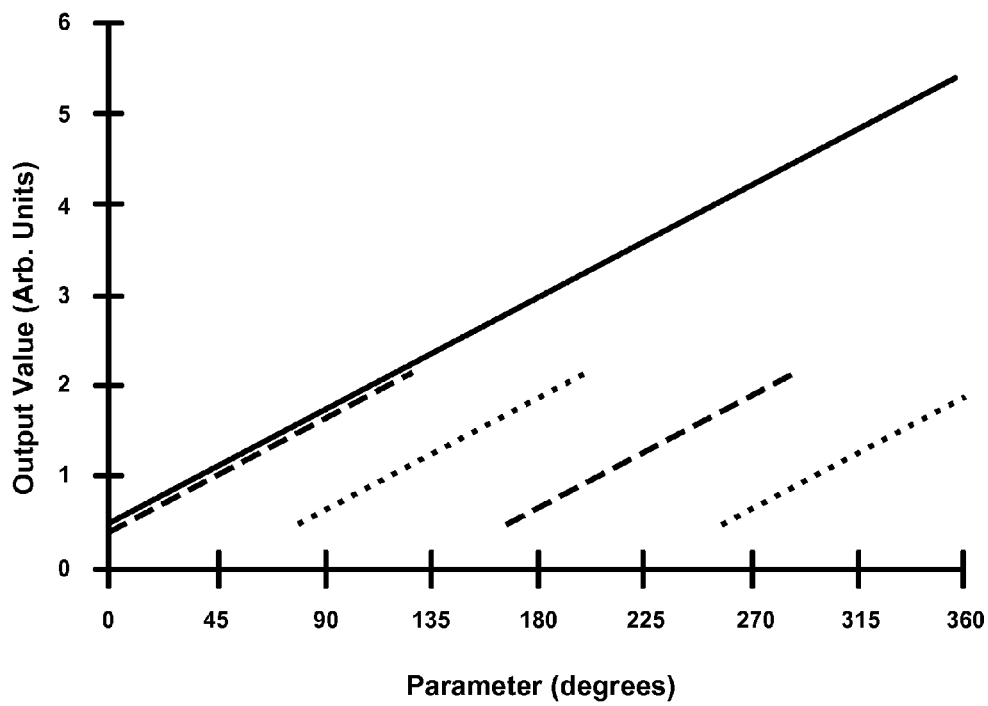
FIG. 6 is a graph illustrating how the example decoder device of FIG. 4 generates an output signal according to this disclosure.
Figure 6:
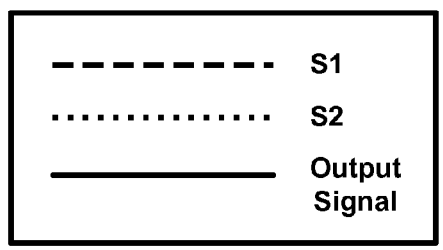

The operation of decoder device 100 will now be described with respect to FIGS. 5 and 6. FIG. 5 is a graph illustrating sinusoidal signals 162 and 164 and transfer function outputs generated by transfer function circuits 118 and 120 according to this disclosure. FIG. 6 is a graph illustrating how decoder device 100 generates output signal 170 based on intermediate signal 172 and offset value 180 according to this disclosure.

One or more sensing devices sense a parameter value, e.g., an angular position, and produce sinusoidal signal 162, sinusoidal signal 164, half-phase signal 166 and half-phase signal 168. Transfer function circuit 118 applies a first transfer function to the values of sinusoidal signal 162 and sinusoidal signal 164 to generate candidate intermediate signal 176 (S1) illustrated in FIG. 5. Similarly, transfer function circuit 120 applies a second transfer function to the values of sinusoidal signal 162 and sinusoidal signal 164 to generate candidate intermediate signal 178 (S2) illustrated in FIG. 5. Candidate intermediate signal selector 122 selects one of candidate intermediate signal 176 and candidate intermediate signal 178 to output as intermediate signal 172 based on half-phase signal 166 and half-phase signal 168.

A first quadrant may be defined to correspond to parameter values, θ, where 0°≤θ≤90°, a second quadrant may be defined to correspond to parameter values, θ, where 90°≤θ≤180°, a third quadrant may be defined to correspond to parameter values, θ, where 180°≤θ≤270°, and a fourth quadrant may be defined to correspond to parameter values, θ, where 270°≤θ≤360°. As shown in FIG. 5, candidate intermediate signal 176 is substantially linear in the first quadrant and the third quadrant, and candidate intermediate signal 178 is substantially linear in the second quadrant and the fourth quadrant. As such, the quadrant information given to candidate intermediate signal selector 122 by half-phase signal 166 and half-phase signal 168 allows candidate intermediate signal selector 122 to select whichever of candidate intermediate signal 176 and candidate intermediate signal 178 is currently operating in a linear region. For example, when half-phase signal 166 and half-phase signal 168 indicate that parameter value is either in the first or third quadrant, candidate intermediate signal selector 122 selects candidate intermediate signal 176 as intermediate signal 172. Similarly, when half-phase signal 166 and half-phase signal 168 indicate that the parameter value is either in the second or fourth quadrant, candidate intermediate signal selector 122 selects candidate intermediate signal 178 as intermediate signal 172.

Meanwhile, candidate offset value generator 142 generates candidate offset values 186, 188, 190 and 192, and offset value selector 144 selects one of candidate offset values 186, 188, 190 and 192 as offset value 180 to add to intermediate signal 172. Summation node 116 adds offset value 180 to intermediate signal 172 to produce output signal 170. Each value in output signal 170 may map to a unique parameter value within a period of sinusoidal signals 162 and 164. In this manner, decoder device 100 may implement a two-input arctangent function to decode two sinusoidal input signals without needing to use sequential circuit elements or look-up tables.

As used herein, sequential circuit elements may refer to circuit elements that retain a particular state after the inputs to the circuit elements are unasserted. Decoder device 100 may, in some examples, use non-sequential circuit elements to implement the two-input arctangent function. As used herein, non-sequential circuit elements refer to circuit elements that do not retain a particular state after the inputs to the circuit elements are unasserted.

In some examples, output signal 170 may vary with respect to the parameter value in a substantially linear fashion for at least the period of sinusoidal signal 162 and/or sinusoidal signal 164. In such examples, decoder 100 is able to provide a linear output that is indicative of the parameter value without the need to use look-up tables.

As shown in FIG. 6, candidate intermediate signal 176 (S1) and candidate intermediate signal 178 (S2) may each be substantially linear within two different parameter intervals. The linear parameter intervals for candidate intermediate signal 176 may overlap with the linear parameter intervals for candidate intermediate signal 178 defining one or more overlap regions. Candidate intermediate signal 176 and candidate intermediate signal 178 may each be associated with two different offset values. For a given overlap region, the sum of candidate intermediate signal 176 and one of the offset values associated with candidate intermediate signal 176 may be substantially equal to the sum of candidate intermediate signal 178 and one of the offset values associated with candidate intermediate signal 178. Half-phase signal 166 and half-phase signal 168 may provide quadrant information indicative of a quadrant occupied by the parameter value and be used to select which of the two different candidate intermediate signals and associated offset values to use to generate the decoded output signal. Each transition between the four quadrants may be defined to occur within an interval of parameter values that defines a transition region. The set of parameter values that define a particular overlap region may encompass the set of parameter values that define a corresponding transition region. In other words, each parameter value within a transition region may be included within the set of parameter values that define a corresponding overlap region. The transitions between quadrants, in some examples, may vary within a transition region due to an error tolerance within the sensors generating the signals indicative of the half-phases. By producing candidate intermediate signals and associated offset values that have substantially equal sums, decoder device 100 may be insensitive to variances in the transitions of half-phase signal 166 and half-phase signal 168 that are within the overlapping regions.

It should be noted that for angles proximate to the quadrant transition at 0 degrees and 360 degrees, two different outputs may occur. However, output signal 170 may still be indicative of a unique parameter value because each of these two signals can be mapped to a single parameter value within a 360 degree interval. In addition, when output signal 170 is said to vary with respect to the parameter value in a substantially linear fashion over a full period of the parameter value, such a variance may include the understanding that angles proximate to the 0/360 degree quadrant transition may map to portions of output signal 170 that extend beyond the maximum and minimum values for output signal 170 shown in FIG. 6. Any of these outlier values may be mapped to a region within the 360 degree interval shown in FIG. 6 by applying a modulus operation followed by an offset operation to output signal 170 with the modulus equal to the value of output signal 170 at 360 degrees minus the value of output signal 170 at zero degrees and the offset equal to the value of output signal 170 at zero degrees.

FIG. 6 illustrates candidate intermediate signal 176 and output signal 170 as being separated by a small offset. However, in some example, candidate intermediate signal 176 may substantially overlap output signal 170, i.e., not be separated from output signal 170 by an offset.

Figure 7:
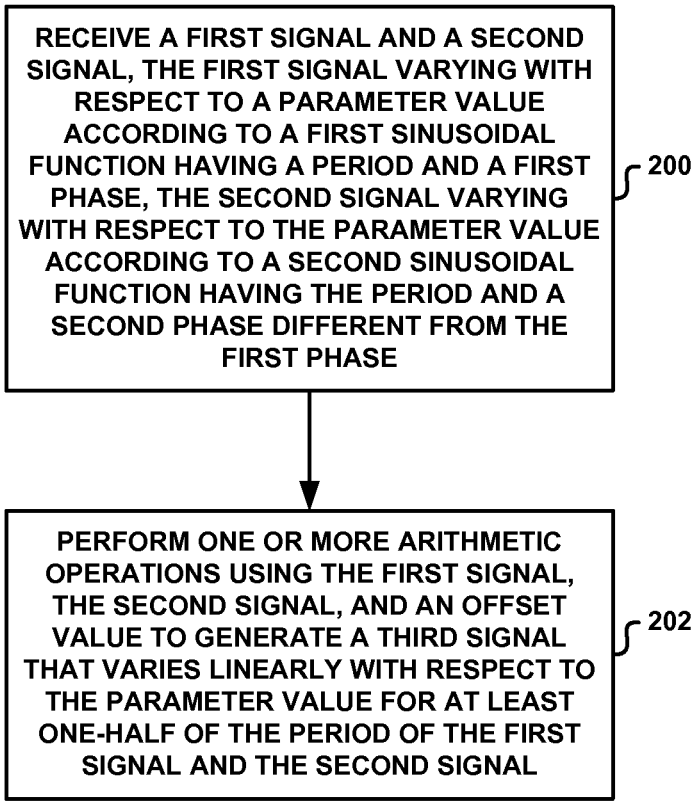
FIG. 7 is a flow diagram illustrating an example technique for decoding sinusoidal input signals according to this disclosure.

FIG. 7 is a flow diagram illustrating another example technique for decoding sinusoidal input signals according to this disclosure. In some examples, the technique in FIG. 7 may be used in decoder device 10 illustrated in FIG. 1 or in decoder device 100 illustrated in FIG. 4.

Transfer function circuit 18 or 118 receives a first signal and a second signal (200). The first signal may vary with respect to a parameter value according to a first sinusoidal function having a period and a first phase. The second signal may vary with respect to the parameter value according to a second sinusoidal function having the period and a second phase different from the first phase. The period of the first sinusoidal function and the period of the second sinusoidal function may be the same.

Transfer function circuit 18 or 118 performs one or more arithmetic operations using the first signal, the second signal, and an offset value to generate a third signal that varies linearly with respect to the parameter value for at least one-half of the period of the first signal and the second signal (202). In some examples, the one or more arithmetic operations may be performed according to one or more of the transfer functions described by equations (1)-(8) herein.

Figure 8:
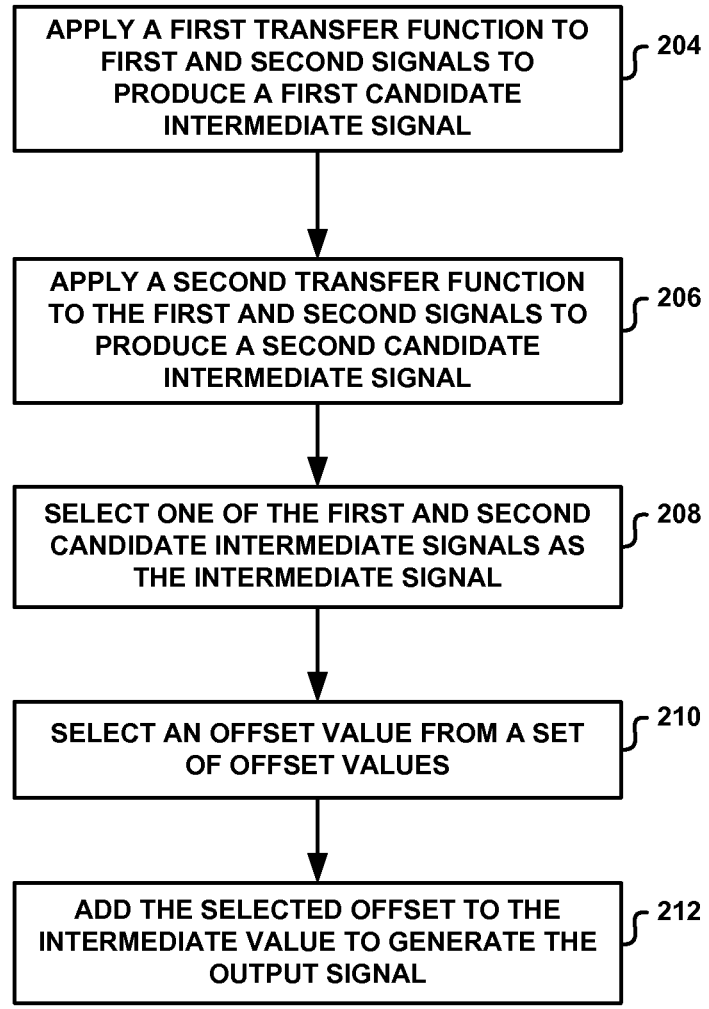
FIG. 8 is a flow diagram illustrating another example technique for decoding sinusoidal input signals according to this disclosure.

FIG. 8 is a flow diagram illustrating another example technique for decoding sinusoidal input signals according to this disclosure. In some examples, the technique in FIG. 7 may be used in decoder device 10 illustrated in FIG. 1 or in decoder device 100 illustrated in FIG. 4.

Transfer function circuit 18 or 118 applies a first transfer function to first and second signals to produce a first candidate intermediate signal (204). In the case where transfer function circuit 18 is used, the first transfer function may correspond to one or both of equations (1) and (3) described herein. In the case where transfer function circuit 118 is used, the first transfer function may correspond to one or both of equations (5) and (7) described herein.

Transfer function circuit 20 or 120 applies a second transfer function to the first and second signals to produce a second candidate intermediate signal (206). In the case where transfer function circuit 20 is used, the first transfer function may correspond to one or both of equations (2) and (4) described herein. In the case where transfer function circuit 120 is used, the first transfer function may correspond to one or both of equations (6) and (8) described herein.

Candidate intermediate signal selector 22 or 122 selects one of the first and second candidate intermediate signals as the intermediate signal (208). More specifically, candidate intermediate signal selector 22 selects the candidate intermediate signals based on half-phase signal 52, and candidate intermediate signal selector 122 selects the candidate intermediate signals based on half-phase signal 166 and half-phase signal 168.

Offset value generator 14 or 114 selects an offset value from a set of offset values (210). More specifically, offset value generator 14 selects the candidate intermediate signals based on half-phase signal 52, and offset value generator 114 selects the candidate intermediate signals based on half-phase signal 166 and half-phase signal 168.

Summation node 16 or 116 adds the selected offset to the intermediate value to generate the output signal (212). In some examples, each value within the output signal may map to a unique parameter value. In further examples, the output signal may vary with respect to the parameter value in a substantially linear fashion.

The circuit components described in this disclosure can be implemented as discrete components, as one or more integrated devices, or any combination thereof. In addition, the circuit components described herein may be fabricated using any of a wide variety of process technologies including CMOS process technologies.

Although a few embodiments have been described in detail above, other modifications are possible. For example, the flow diagrams depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
   receiving a first signal and a second signal, the first signal varying with respect to a parameter value according to a first sinusoidal function having a period and a first phase, the second signal varying with respect to the parameter value according to a second sinusoidal function having the period and a second phase different from the first phase; and
   using a transfer function circuit to generate a third signal based on the first signal and the second signal according to one of the following transfer functions:

$$S = \frac{A - B + \text{off}}{A + \text{off}} \text{ and } S = \frac{B - A + \text{off}}{-A + \text{off}}$$

where S represents the third signal, A represents the first signal, B represents the second signal, and off represents an offset value.

2. The method of claim 1, wherein the offset value is a first offset value, and wherein the offset value is an offset value within the range of approximately 1 to approximately 10 times at least one of an amplitude of the first signal and an amplitude of the second signal.

3. The method of claim 1, wherein the offset value is a first offset value, wherein generating the third signal comprises generating the third signal according to the following transfer function:

$$S1 = \frac{A - B + \text{off}}{A + \text{off}}$$

where S1 represents the third signal, and wherein the method further comprises:
   generating a fourth signal based on the first signal and the second signal according to the following transfer function:

$$S2 = \frac{B - A + \text{off}}{-A + \text{off}}$$

where S2 represents the fourth signal;
   selecting one of the third signal and the fourth signal as an intermediate signal based on a signal indicative of the half-phase occupied by the parameter value;
   selecting a second offset value from a set of at least two different candidate offset values based on the signal indicative of the half-phase occupied by the parameter value; and
   adding the second offset value to the intermediate signal to generate an output signal.

4. The method of claim 1, wherein the offset value is a first offset value, wherein generating the third signal comprises generating the third signal according to the following transfer function:

$$S1 = \frac{A - B + \text{off}}{A + \text{off}}$$

where S1 represents the third signal, and wherein the method further comprises:

generating a fourth signal based on the first signal and the second signal according to the following transfer function:

$$S2 = \frac{B - A + \text{off}}{-A + \text{off}}$$

where S2 represents the fourth signal;

selecting one of the third signal and the fourth signal as an intermediate signal based on a first signal indicative of a half-phase occupied by the parameter value within a first half-phase partition and a second signal indicative of a half-phase occupied by the parameter value within a second half-phase partition;

selecting a second offset value from a set of at least four different candidate offset values based on the first signal indicative of a half-phase occupied by the parameter value and the second signal indicative of a half-phase occupied by the parameter value; and adding the second offset value to the intermediate signal to generate an output signal.

5. A device comprising:

a transfer function circuit configured to receive a first signal and a second signal, the first signal varying with respect to a parameter value according to a first sinusoidal function having a period and a first phase, the second signal varying with respect to the parameter value according to a second sinusoidal function having the period and a second phase different from the first phase, the transfer function circuit being further configured to generate a third signal based on the first signal and the second signal according to one of the following transfer functions:

$$C = \frac{A - B + \text{off}}{A + \text{off}} \text{ and } C = \frac{B - A + \text{off}}{-A + \text{off}}$$

where C represents the third signal, A represents the first signal, B represents the second signal, and off represents an offset value.

6. The device of claim 5, wherein the offset value is an offset value within the range of approximately 1 to approximately 10 times at least one of an amplitude of the first signal and an amplitude of the second signal.

7. The device of claim 5, wherein the offset value is a first offset value, wherein the transfer function circuit is a first transfer function circuit configured to generate the third signal according to the following transfer function:

$$S1 = \frac{A - B + \text{off}}{A + \text{off}}$$

where S1 represents the third signal, and wherein the device further comprises:

a second transfer function circuit configured to generate the fourth signal based on the first signal and the second signal according to the following transfer function:

$$S2 = \frac{B - A + \text{off}}{-A + \text{off}}$$

where S2 represents the fourth signal;

a first multiplexer configured to select one of the third signal and the fourth signal as an intermediate signal based on a signal indicative of the half-phase occupied by the parameter value;

a second multiplexer select a second offset value from a set of at least two different candidate offset values based on the signal indicative of the half-phase occupied by the parameter value; and a summation node configured to add the second offset value to the intermediate signal to generate an output signal.

8. The device of claim 5, wherein the offset value is a first offset value, wherein the transfer function circuit is a first transfer function circuit configured to generate the third signal according to the following transfer function:

$$S1 = \frac{A - B + \text{off}}{A + \text{off}}$$

where S1 represents the third signal, and wherein the device further comprises:

a second transfer function circuit configured to generate a fourth signal based on the first signal and the second signal according to the following transfer function:

$$S2 = \frac{B - A + \text{off}}{-A + \text{off}}$$

where S2 represents the fourth signal;

a first multiplexer configured to select one of the third signal and the fourth signal as an intermediate signal based on a first signal indicative of a half-phase occupied by the parameter value within a first half-phase partition and a second signal indicative of a half-phase occupied by the parameter value within a second half-phase partition;

a second multiplexer configured to select a second offset value from a set of at least four different candidate offset values based on the first signal indicative of a half-phase occupied by the parameter value and the second signal indicative of a half-phase occupied by the parameter value; and a summation node configured to add the second offset value to the intermediate signal to generate an output signal.

9. A method comprising:
receiving a first signal and a second signal, the first signal varying with respect to a parameter value according to a first sinusoidal function having a period and a first phase, the second signal varying with respect to the parameter value according to a second sinusoidal function having the period and a second phase different from the first phase; and
using a transfer function circuit to perform one or more arithmetic operations using the first signal, the second signal, and an offset value to generate a third signal that varies linearly with respect to the parameter value for at least one-half of the period of the first signal and the second signal.

10. The method of claim 9, wherein performing the one or more arithmetic operations comprises generating the third signal based on the first signal and the second signal according to one of the following transfer functions:

$$S = \frac{A - B + \text{off}}{A + \text{off}} \text{ and } S = \frac{B - A + \text{off}}{-A + \text{off}}$$

where S represents the third signal, A represents the first signal, B represents the second signal, and off represents an offset value.

11. The method of claim 9, wherein the offset value is an offset value within a range of approximately 1 to approximately 10 times at least one of an amplitude of the first signal and an amplitude of the second signal.

12. The method of claim 9, wherein the transfer function circuit is a first transfer function circuit and wherein the one or more arithmetic operations comprises a first set of arithmetic operations, wherein the method further comprises:
performing, with a second transfer function circuit, a second set of arithmetic operations using the first signal, the second signal, and the offset value to generate a fourth signal that varies linearly with respect to the parameter value for at least one-half of the period of the first signal and the second signal; and
generating an output signal based on the third signal and the fourth signal that varies linearly with respect to the parameter value for at least the period of the first signal and the second signal.

13. The method of claim 12, wherein generating the output signal comprises:
selecting one of the third signal and the fourth signal as an intermediate signal based on at least one signal indicative of a half-phase occupied by the parameter value; and
generating the output signal based on the intermediate signal.

14. The method of claim 13, wherein the offset value is a first offset value, and wherein generating the output signal based on the intermediate signal comprises:
generating the output signal based on the intermediate signal and a second offset value.

15. The method of claim 14, wherein generating the output signal based on the intermediate signal and the second offset value comprises:
adding the second offset value to the intermediate signal to generate the output signal.

16. The method of claim 14, generating the output signal based on the intermediate signal and the second offset value comprises:
selecting the second offset value from a set of at least two different candidate offset values based on the at least one signal indicative of the half-phase occupied by the parameter value.

17. The method of claim 16,
wherein the at least one signal indicative of the half-phase occupied by the parameter value comprises a first signal indicative of a half-phase occupied by the parameter value within a first half-phase partition and a second signal indicative of a half-phase occupied by the parameter value within a second half-phase partition, and
wherein the set of at least two different candidate offset values comprises a set of at least four different offset values.

18. A device comprising:
a transfer function circuit configured to receive a first signal and a second signal, the first signal varying with respect to a parameter value according to a first sinusoidal function having a period and a first phase, the second signal varying with respect to the parameter value according to a second sinusoidal function having the period and a second phase different from the first phase, the transfer function circuit being further configured to perform one or more arithmetic operations using the first signal, the second signal, and an offset value to generate a third signal that varies linearly with respect to the parameter value for at least one-half of the period of the first signal and the second signal.

19. The device of claim 18, wherein the transfer function circuit is further configured to generate the third signal based on the first signal and the second signal according to one of the following transfer functions:

$$S = \frac{A - B + \text{off}}{A + \text{off}} \text{ and } S = \frac{B - A + \text{off}}{-A + \text{off}}$$

where S represents the third signal, A represents the first signal, B represents the second signal, and off represents an offset value.

20. The device of claim 18, wherein the offset value is an offset value within a range of approximately 1 to approximately 10 times at least one of an amplitude of the first signal and an amplitude of the second signal.

21. The device of claim 18,
wherein the transfer function circuit is a first transfer function circuit and wherein the one or more arithmetic operations comprises a first set of arithmetic operations,
wherein the device further comprises a second transfer function circuit configured to perform a second set of arithmetic operations using the first signal, the second signal, and the offset value to generate a fourth signal that varies linearly with respect to the parameter value for at least one-half of the period of the first signal and the second signal, and
wherein the device is further configured to generate an output signal based on the third signal and the fourth signal that varies linearly with respect to the parameter value for at least the period of the first signal and the second signal.

22. The device of claim 21,
wherein the device further comprises a multiplexer configured to select one of the third signal and the fourth signal as an intermediate signal based on at least one signal indicative of a half-phase occupied by the parameter value, and wherein the device is further configured to generate the output signal based on the intermediate signal.

23. The device of claim 22,
wherein the offset value is a first offset value, and
wherein the device is further configured to generate the output signal based on the intermediate signal and a second offset value.

24. The method of claim 23, wherein the device further comprises:
a summation node configured to add the second offset value to the intermediate signal to generate the output signal.

25. The device of claim 23, wherein the device further comprises:
a multiplexer configured to select the second offset value from a set of at least two different candidate offset values based on the at least one signal indicative of the half-phase occupied by the parameter value.

26. The device of claim 25,
wherein the at least one signal indicative of the half-phase occupied by the parameter value comprises a first signal indicative of a half-phase occupied by the parameter value within a first half-phase partition and a second signal indicative of a half-phase occupied by the parameter value within a second half-phase partition, and
wherein the set of at least two offset values comprises a set of at least four different candidate offset values.

* * * * *